UNITED STATES PATENT OFFICE.

DANIEL M. LAMB, OF NEW YORK, N. Y.

MOTH AND WATER PROOFING COMPOUND.

SPECIFICATION forming part of Reissued Letters Patent No. 9,633, dated April 5, 1881.

Original No. 224,297, dated February 10, 1880. Application for reissue filed July 13, 1880.

*To all whom it may concern:*

Be it known that I, DANIEL M. LAMB, of the city, county, and State of New York, have invented a new and useful Compound for Treating Goods to Render them Water-Proof and also Moth-Proof; and I hereby declare the following to be a full and clear description of the same.

The object of this invention is to prepare a compound for and apply the same to the treatment of various kinds and qualities of goods, for the purpose of rendering them impervious to water or moisture, and at the same time to render them indestructible by moths or other similar vermin.

The compound prepared for this purpose is applicable to a large variety of goods, among which is embraced every variety of textile fabrics, all kinds of feathers, furs, &c., all leathers, paper, and other like materials, as well as wood, stone, and metal, and, in short, every article the preservation of which from the humidity of the atmosphere or a more complete saturation with water is a desirable object.

While the preparation hereinafter described is an absolute preventive from the attack of moths or other similar insects or vermin, it is also an absolute water proofing or repelling material, and it may be used as such where waterproofing is the only object sought, or it may be used where the only object sought is to render the goods moth or vermin proof. The material used for this purpose is so absolutely colorless and odorless that it may be applied to any textile fabrics, feathers, flowers, kid gloves, stuffed birds or animals, as well as any variety of building-stone, wood, or metal, without in the slightest degree injuring the color or appearance of the object to which it is applied, even though the color or shade be of the most delicate tint possible, and the effect will be the same no matter what the object to which the preparation or compound is applied—*i. e.*, it will become immediately water-proof or water-repellent, and the color of the article to which the compound is applied will remain more permanent and durable by means of the waterproofing, as fermentation and consequent decomposition will thereby be prevented.

The materials used for this purpose, the manner of compounding them, and the process of treating the goods are as follows:

I take as a basis of forming the compound any of the lighter hydrocarbons from petroleum—such, for instance, as naphtha, benzine, benzole, gasoline, &c.—but always using such as are of °.70 Baumé gravity or over; and then in the hydrocarbon as provided, which may be taken in any desired or convenient quantity, I put for two gallons of the oil or hydrocarbon one-quarter of an ounce to two ounces of refined paraffine and about one-quarter of an ounce to one ounce of some hydrocarbon gum, such as india-rubber, gutta-percha, milkweed, &c., and let this mixture stand until the hydrocarbon gum and the paraffine shall have been fully dissolved; and to facilitate this part of the operation the paraffine and the gum should be cut into small pieces.

Instead of putting the paraffine and the gum into the same solvent, the solvent may be divided into two equal parts, and into one of these place the paraffine and into the other the gum, in the proportion stated above, and after these separately shall have been dissolved the whole mass may be united in a common vessel, in which the remaining part of the process of fabrication may be completed.

The next step in the fabrication of the compound will be to treat it with the gas produced as hereinafter described. I pass the said gas up through the mass of the compound from the bottom to the top, the gas rising through the mass of the compound, and so acting upon each atom of the same. The way to do this will be as follows, viz: To each forty gallons of the mixture I add about four pounds of the chloride of sodium, and also about four pounds of sulphuric acid, the salt to be put in first, and preferably spread pretty evenly over the bottom of the vessel, and then the acid added immediately thereafter, so as to allow it to settle down directly upon the salt, and the action of this acid upon the salt will be to generate a gas. The gas generated in this manner will rise up through the mass under treatment and attack the mucilaginous and sedimentary portions of the compound and precipitate them to the bottom of the vessel, the whole operation of the gas treatment upon the solution being to effect a complete change of the compound.

The compound or solution will be allowed to remain standing quietly, subject to the gas treatment, as above described, for about twenty-four hours, and then the sediment will be drawn off from the bottom of the vessel or the purified compound from the top of the vessel.

The fabrication of this compound can best be conducted in a vessel similar to that called an "agitator" in coal-oil-refining operations, and the gas be generated within this fabricating-vessel above described.

After the mixture or compound shall have stood for twenty-four hours subject to the gaseous treatment above described, and the sediment has been drawn off from the bottom of the vessel, then a powerful current of air is forced up through the mass of the compound, so as to drive out all remaining gases that may be held in suspension within the mass of the compound. For this purpose some suitable air-forcing apparatus will be employed, and from this air compressor or forcer air will be driven through suitable piping or connections into the bottom of the fabricating-vessel, and from one or more perforations or apertures of such pipe air will be driven up through the mass of the compound under treatment, so as to blow or drive out the remaining gases therein contained.

A process or treatment somewhat similar to that above described has been employed heretofore by me in the treatment of crude oils, such oils having been subject to the gaseous treatment, and afterward agitated with air; but the application of the gaseous treatment and air agitation in the present instance is to a compound, as hereinbefore described, of an essentially different character to the crude oils to which I have heretofore applied it, and for which I obtained Letters Patent No. 183,401, in 1876.

In the present instance the agitation or blowing will be continued for an hour, more or less, and then a sufficient quantity of water will be added, so as to thoroughly wash the mixture free from all impurities, and during this part of the operation a small quantity of caustic soda or ammonia will be added, so as to thoroughly wash out and remove any trace of gas or acid. After this agitation or blowing and washing shall have been completed, the mass will remain undisturbed for about an hour, during which time a thorough subsidence of all remaining impurities will occur, and the sediment may then be drawn off from the bottom of the vessel, or the completed compound from the top of the vessel, and the completed compound will then be kept in a tightly-closed vessel to prevent evaporation.

The goods to which this compound is to be applied will then be treated in the following manner, viz: A shallow vessel or bath will be provided, and a cover for this vessel will set into a water-chamber, so as to seal it up tightly against loss by evaporation during the treatment of the goods. This vessel will be filled, or partly filled, with the compound prepared as above described, and then the goods to be treated will be immersed in the compound so as to thoroughly saturate them, and the length of time required for this purpose will vary with the kind and quality and thickness of goods under treatment; but a half-hour will suffice for thin fabrics, gloves, &c., while for thick cloths one hour may be required, while furs, leather, and other heavy articles may require even more time.

In lieu of the bath, the compound may be applied with a brush; but of course that cannot be so perfectly done, and the bath will always be used where it is possible.

After the bath or coating all adhering moisture will be allowed to drain off from the goods, and they will then be hung up to dry in a closed room, kept at a uniform temperature of about 85° to 100° Fahrenheit by means of steam pipes or radiators.

After the goods shall have been thoroughly dried they may be put away in such packages or cases as are usually employed for the purpose.

Having described my invention, I claim—

1. The process herein described of preparing a water and moth proofing compound, by treating a solution of refined paraffine and the described hydrocarbon gum dissolved in suitable light hydrocarbon solvent, as described, and then submitting the solution so formed for about twenty-four hours (more or less) to gas formed by the mixture of chloride of sodium and sulphuric acid, and then, immediately after such gaseous treatment, submitting the compound to a powerful agitation of a current of air, whereby the remaining gas is driven from the compound, and then washing the compound with water and an alkaline solution, as and for the purpose set forth.

2. The water and moth proof compound formed by the union of refined paraffine and a hydrocarbon gum, as described, dissolved in any suitable light hydrocarbon, treated with the herein-described gas, and freed from residual acid gas and other vapors, as herein set forth.

DANIEL M. LAMB.

Witnesses:
J. B. THURSTON,
CHAS. T. HOWELL.